United States Patent [19]

Shimizu et al.

[11] Patent Number: 4,851,171
[45] Date of Patent: Jul. 25, 1989

[54] METHOD AND APPARATUS FOR CONTROLLING BACK PRESSURE IN INJECTION MOLDING MACHINE

[75] Inventors: Miyuki Shimizu; Yoshihiko Yamazaki, both of Nagano, Japan

[73] Assignee: Nissei Plastics Industrial Co., Ltd., Japan

[21] Appl. No.: 860,112

[22] Filed: May 6, 1986

[30] Foreign Application Priority Data

May 14, 1985 [JP] Japan ................................ 60-101987

[51] Int. Cl.$^4$ ............................................. B29C 45/76
[52] U.S. Cl. ................................ 264/40.5; 264/328.1; 425/135; 425/149
[58] Field of Search .................... 264/40.1, 40.5, 328.1, 264/40.3; 425/145, 149, 135

[56] References Cited

U.S. PATENT DOCUMENTS 4,540,359 9/1985 Yamazaki ........................ 425/135

FOREIGN PATENT DOCUMENTS 57-142337 9/1982 Japan .................................. 264/40.1
58-11128 1/1983 Japan .................................. 264/40.1

Primary Examiner—Jan H. Silbaugh
Assistant Examiner—Mary Lynn Fertig
Attorney, Agent, or Firm—Ostrolenk, Faber, Gerb & Soffen

[57] ABSTRACT

A method and apparatus for controlling back pressure in an injection molding machine. Forward and backward movements of an injection plunger are converted into rotational motion and the turning force and back pressure of the injection plunger during the step of charging material are controlled. An electric motor serves for carrying out back pressure control and a torque limiting control function is performed to limit the output torque of the motor according to the magnitude of a set value of back pressure.

12 Claims, 6 Drawing Sheets

METHOD AND APPARATUS FOR CONTROLLING BACK PRESSURE IN INJECTION MOLDING MACHINE

BACKGROUND OF THE INVENTION

1. Field of the Invention

This invention relates to method and apparatus for controlling back pressure of an injection plunger in the step of charging material in an injection molding machine using an electric motor as a driving source.

2. Description of the Prior Art

Figure 6:
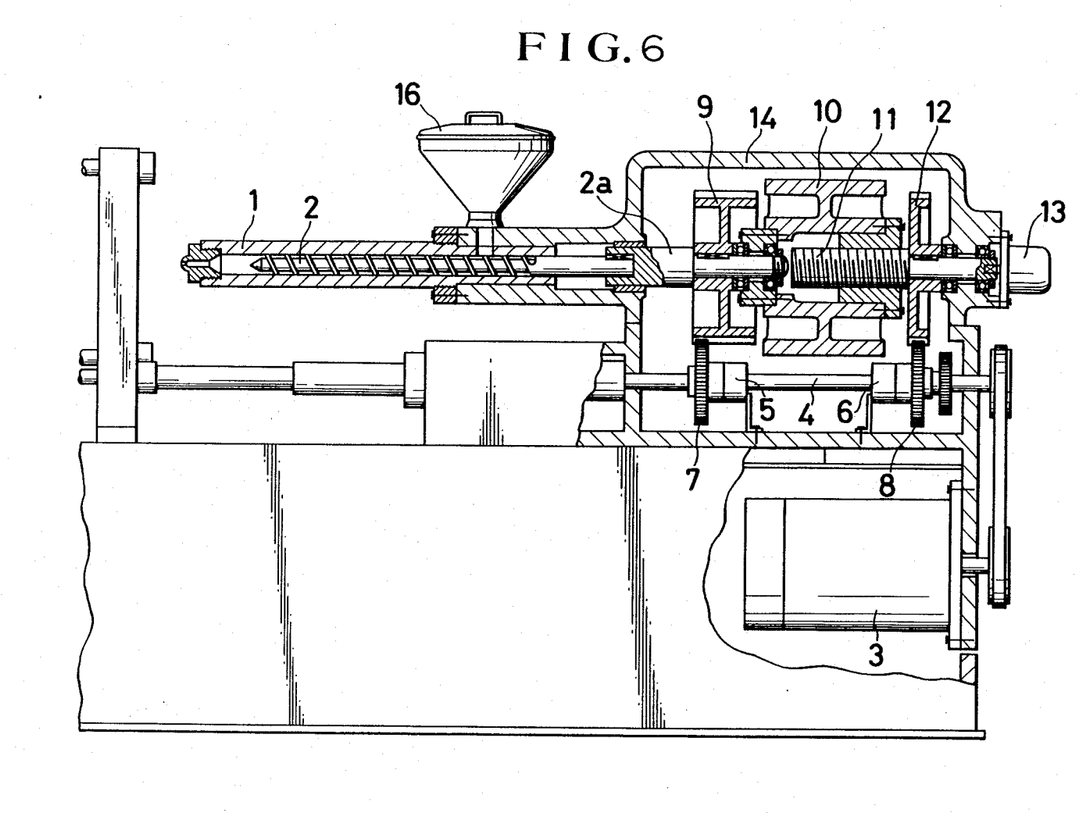
FIG. 6 is a schematic longitudinal sectional side view of an electrically-driven injection molding machine employing a back pressure open loop control.

In an injection molding machine of this type, rotation and forward movement of an injection plunger 2 houses within an injection heating tube 1 are effected by means of an electric motor 3, as illustrated in FIG. 6.

The turning force of the motor 3 is transmitted to the injection plunger 2 through gears 7 and 8 provided on a transmission shaft 4 along with clutches 5 and 6.

The gear 7 is meshed with a gear 9 on a rotational shaft 2a at the rear of the plunger, and the turning force caused by the motor 3 is transmitted to the gear 9 so that the injection plunger 2 may be rotated.

The gear 8 is meshed with a gear 12 provided on a screw shaft 11 of a plunger moving member 10, and the turning force caused by the motor 3 is transmitted from the gear 12 to the screw shaft 11 to act as a thrust of the axially movable plunger moving member 10 connected to the rotational shaft 2a, thereby forwardly moving the injection plunger 2.

The back pressure in the step of charging material is permitted to be controlled by means of an electromagnetic brake 13 connected to the rear end of the screw shaft 11. The electromagnetic brake 13 is secured to the rear wall of a housing 14 with the injection heating tube 1 mounted on the front wall thereof.

In the molding machine constructed as described above, rotation of the gear 9 causes the injection plunger 2 to rotate along with the rotational shaft 2a whereby material from a hopper 16 may be transferred forwardly of the plunger.

The backing force generated in the injection plunger 2 upon transfer of material is caused to generate the turning force in the backing direction of the plunger in the screw shaft 11 through the plunger moving member 10. At the same time, the control is made by the electromagnetic brake 13 to control the torque of the screw shaft 11, thereby charging the material while applying the plunger back pressure to a molten material.

The technique disclosed in Japanese Patent Application Laid-Open No. 58-179631 as a method for controlling back pressure of a plunger in the injection molding machine as mentioned above has an open loop control system.

There the plunger back pressure is controlled by an electrically-driven brake, a screw shaft, a member for converting the turning force of the screw shaft into thrust of the injection plunger and the like are interposed between the injection plunger and the back pressure control means. Therefore, pressure received by the back pressure control means from the injection plunger is indirect, thus posing a problem of inaccurate control because of a frictional force between the aforesaid interposed members.

To overcome the problem, the present inventors have previously developed (see Japanes Patent Application No. 59-153340) a method for controlling back pressure of a plunger, in which an electric motor is used as a back presure control device, and feed-back control and the turning force of the motor are utilized.

Figure 7:
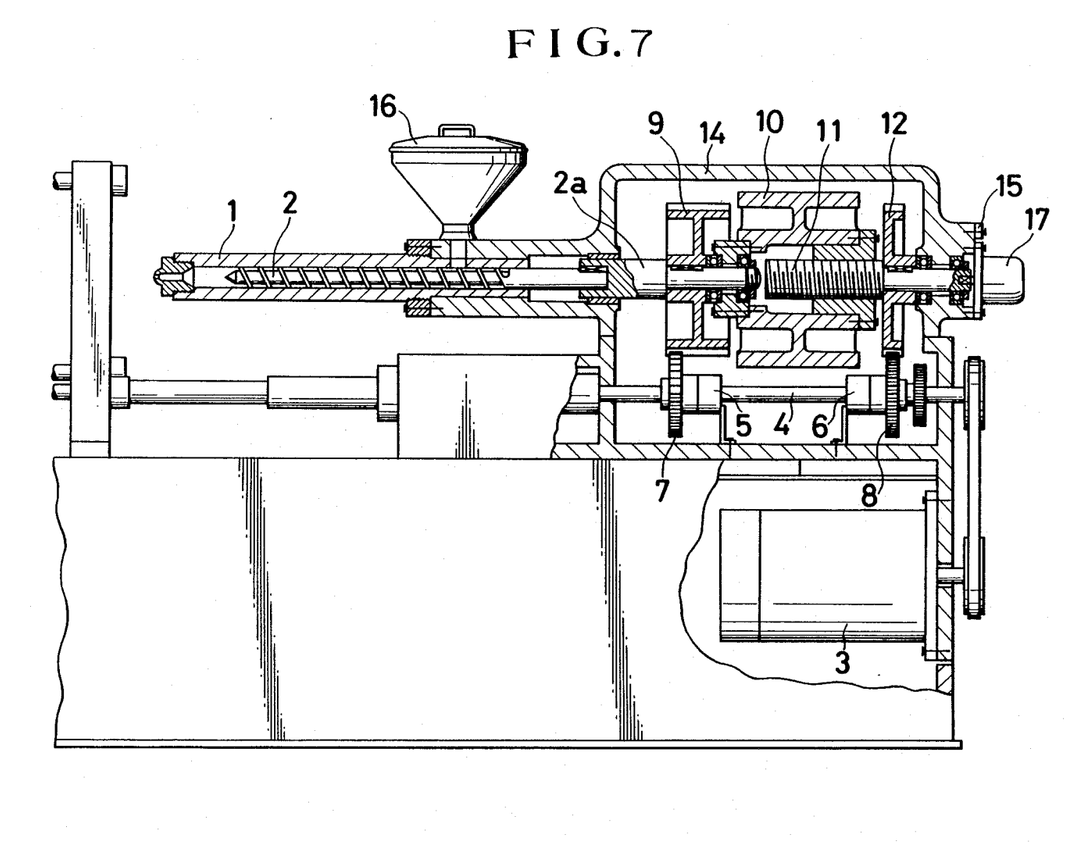
FIG. 7 is a schematic longitudinal sectional side view of an electrically-driven injection molding machine employing a back pressure feedback control.

In this prior art, as shown in FIG. 7, an electric motor 17 is provided in place of the aforesaid electromagnetic brake on the housing 14, and a pressure sensor in the form of a strain gauge is mounted as a back pressure sensor 15 at a part subjected to reaction of the injection plunger of the rear wall of the housing, for example, at the wall of a portion where the rear end of the screw shaft 11 is held. It is to be noted that the back pressure sensor 15 can be replaced by a resin pressure sensor generally used, in which case it is provided on the injection heating tube 1 for measuring molten resin pressure.

A pressure detection signal outputted from the back pressure sensor 15 is converted by a converter circuit 20 (FIG. 8) into a pressure detection signal ep which is formed of a voltage signal and applied to an adding point A. A pressure command signal epi having a voltage level which is controlled according to a value set by a back pressure setting device 21 is applied from the device 21 to the adding point A. As the result, a differential signal of $epi - ep = \Delta ep$ is outputted from the adding point A, amplified by a pressure control amplifier 22 and applied to an adding point B as a current command signal $\Delta epo$. A current of the motor 17 for deciding the output torque of the motor 17 is detected by a current detector 23, and the curent detection signal is converted by a converter circuit 24 into a current detection signal ei formed of a voltage signal and applied to the adding point B. As a consequence, a differential signal of $\Delta - epo - ei = \Delta ei$ is outputted from the adding point B, and the differential signal $\Delta ei$ is amplified by a current control amplifier 25 into $\Delta eio$, after which it is applied to a power converter 26.

Figure 8:
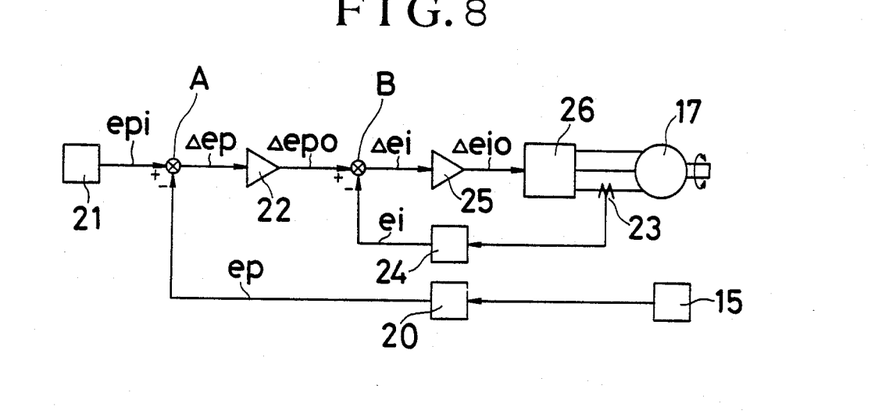
FIG. 8 is a block diagram of the back pressure control apparatus shown in FIG. 7.

The power converter 26 is composed of an ignition control circuit using a thyristor or a pluse width control circuit using a transistor, whereby a predetermined current is applied to the motor according to the signal $\Delta eio$ to drive the motor 17.

However, the back pressure control apparatus as described above has the problem as noted below because the maximum output current (the maximum output torque of the motor) has a given value determined according to the specification of the motor 17 and the power converter 26 irrespective of the pressure command value.

Figure 9:
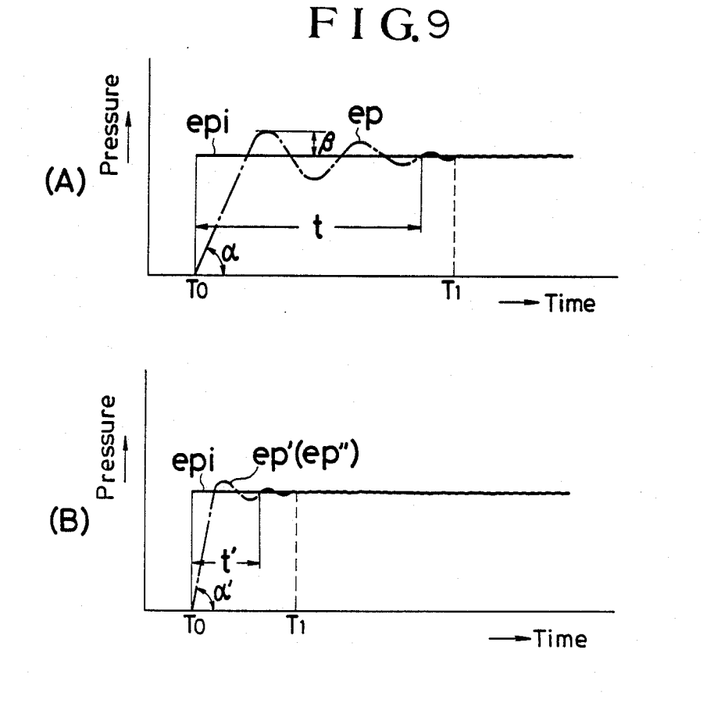

As shown in FIG. 9, assuming that the material charging step after completion of injection step begins at time $T_o$ at which the initial value of the back pressure of the injection plunger is in a state of 0 to output the pressure command signal epi having a stepwise voltage waveform from the back pressure setting device 21, the output of the motor 17 varies to be greater or smaller than the command pressure in the transient period till the back pressure comes into coincidence with the set value thereof. Accordingly, the back pressure detection signal ep changes in the mode of damping oscillation as shown and comes into coincidence with the pressure command signal epi after a lapse of a predetermined time.

In this case, the amplification degree of the pressure control amplifier 22 is the degree required for controlling the back pressure, and if the pressure command value is large, the differential signal $\Delta ep$ between the pressure command signal epi and the pressure detection signal ep increases, and the current command signal $\Delta epo$ excessively increases as a consequence of which if the differential signal Δepo is positive, the injection plunger 2 is pressed by the motor 17 with a force greater than needed (3 to 5 times of the rated value of the back pressure), whereas if the differential signal Δepo is negative, the plunger is forced back by the load of molten material of the injection plunger.

As a result, the injection plunger is repeatedly reciprocated, and the back pressure repeats its great oscillation and gradually reaches the pressure command value.

The over-shoot β of the pressure detection signal ep and the setting time t are determined according to the magnitude of the current command signal Δepo, and the rising angle α of the pressure detection signal ep is determined according to the amplification degree of the pressure control amplifier 22. However, in the method in which the maximum output of the motor 17 is determined to be constant irrespective of the pressure command value as in prior art, if the pressure command value is large, the current command signal Δepo excessively increases, and the setting time till the back pressure reaches the set value of the back pressure is prolonged and the peak value of the back pressure excessively increases, posing a problem.

SUMMARY OF THE INVENTION

It is an object of the present invention to provide a back pressure control method and a back pressure control apparatus in an injection molding machine wherein in the control of back pressure of an injection plunger by way of feedback control using an electric motor, an upper limit of a current command value is limited according to the magnitude of a pressure command value and a current detection signal value is corrected to be increased and decreased according to the magnitude of a pressure command value, so as to be able to provide torque limiting control in which the upper limit of the output torque of the motor according to the magnitude of the pressure command value, in either case of which the magnification degree of a pressure control amplifier may be increased to control the motor thereby rendering possible the back pressure control by which the back pressure of the injection plunger promptly reaches the set value, as a consequence of which there can be provided the back pressure control with excellent responsiveness and high precision without being affected by the frictional force of the transmission mechanism.

The method of the present invention having the above-described object is characterized in that an electric motor is used as a back pressure control device to provide the torque limiting control which limits the upper limit of the output torque of the motor according to the magnitude of the set value of the back pressure, thereby electrically detecting as the back pressure force the molten material pressure or the backing force of the injection plunger and driving and controlling the motor by the feedback control so that the back pressure may come into coincidence with the set value.

The aforesaid apparatus comprises an electric motor control circuit which uses, as a back pressure sensor, a pressure sensor for detecting pressure of a molten material or a backing force of an injection plunger, which arithmetically amplifies a differential signal between a pressure detection signal obtained by detecting the pressure of the molten material or the backing force of the injection plunger as a back pressure and a pressure command signal determined by a set value of a back pressure setting device into a current command signal, and which controls the back pressure by said motor driven by a signal obtained by arithmetically amplifying a differential signal between a current detection signal obtained by detecting a current of said motor by means of a current detector and said current command signal, and a current command signal control circuit controlled by said pressure command signal and limiting the upper limit of said current command signal according to the magnitude of said pressure command signal.

The apparatus further comprises said motor control circuit and a current detection signal correcting circuit controlled by said pressure command signal and correcting an increase or decrease in said current detection signal value according to the magnitude of said pressure command signal.

In the above-described method and apparatus, the current command signal limiting circuit limits the upper limit of the current command value according to the magnitude of the pressure command value and therefore if the pressure command value is large, the magnitude of the current command signal is limited to a lower value than that of prior art apparatus.

In the apparatus provided with a current detection signal correcting circuit, this correcting circuit corrects an increase or decrease in current detection signal value according to the magnitude of the pressure command value, and therefore if the pressure command value is large, the value of the current detection signal in the current control becomes larger than that of prior art.

BRIEF DESCRIPTION OF THE DRAWINGS

FIG. 5 (A) is a characteristic curve showing an example of characteristics of the current command signal limiting circuit;

FIG. 5 (B) is a characteristic curve showing an example of characteristics of the current detection signal correcting circuit;

FIG. 9 is a chracteristic curve showing the respnsive characteristic of the real back pressure relative to the pressure command; FIG. 9 (A) being in the case of control shown in FIG. 8, and FIG. 9 (B) being in the case of the present invention.

DETAILED DESCRIPTION OF THE INVENTION

This invention will be further described in detail by way of embodiments shown in FIGS. 1 to 4. The same parts as those of prior art shown in FIG. 8 bear the same reference numerals.

Figure 1:
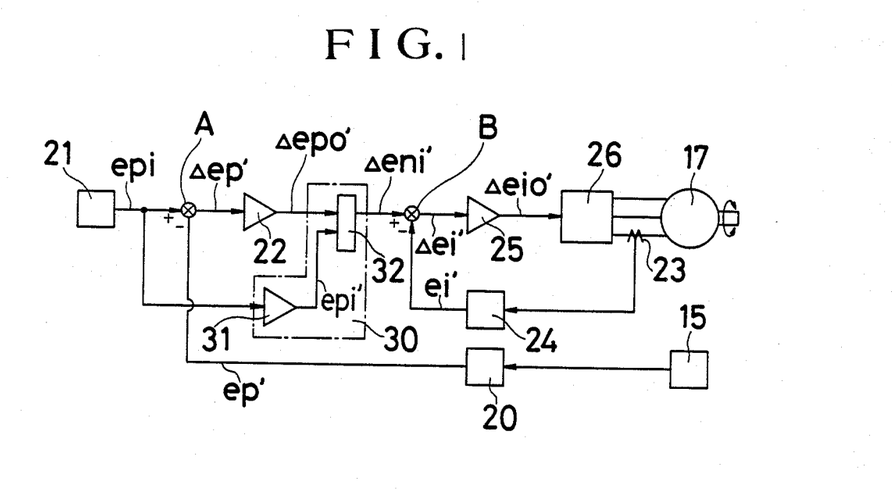
FIG. 1 is a block diagram of apparatus capable of carrying out the back pressure control method in accordance with the present invention.
Figure 3:
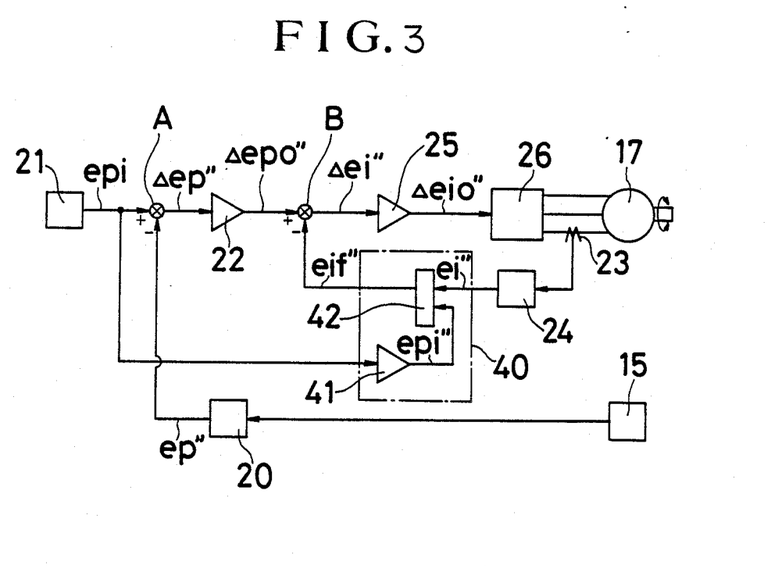
FIG. 3 is a block diagram of apparatus in another embodiment according to the present invention.

A back pressure sensor shown in FIGS. 1 and 3 is a back pressure sensor 15 mounted on the rear wall of the housing 14, and operates when the material is charged as previously mentioned.

When charging of material is initiated, a thrust force as reaction of a plunger back pressure is generated in the screw shaft 11. This plunger back pressure is applied to the rear wall of the housing through a bearing, as a result of which stress is also applied to the wall and a deformation which is minute is formed also in the portion where the back pressure sensor 15 is mounted corresponding to the plunger back pressure, said deformation amount being electrically measured by the back pressure sensor 15 and detected as a plunger back pressure.

Figure 2:
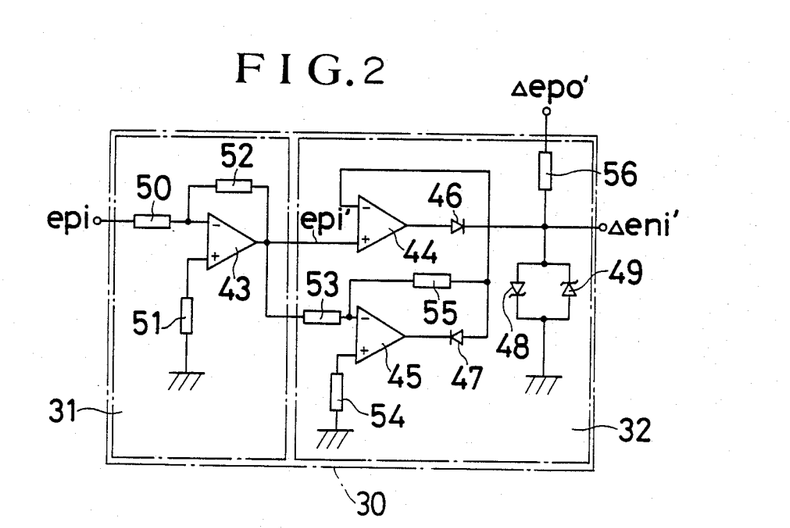
FIG. 2 is a circuit diagram showing a specific example of a current command signal limiting circuit shown in FIG. 1.

In the embodiment shown in FIG. 1, a current command signal limiting circuit 30 for limiting the upper limit of a current command value according to the magnitude of a pressure command value is added to a pressure control amplifier. The circuit 30 comprises, as shown in FIG. 2 in detail, an amplifier 31 composed of an operational amplifier 43, and resistors 50, 51 and 52, and an output limiting circuit 32 composed of operational amplifiers 44 and 45, diodes 46 and 47, Zener diodes 48 and 49, and resistors 53, 54, 55 and 56. Pressure command signal epi outputted from the back pressure setting device 21 is amplified by the amplifier 31 with a predetermined amplification degree and outputted as a command signal epi'. The output limiting circuit 32 receives a current command signal $\Delta$epo' from the pressure control amplifier 22 and said command signal epi' from the amplifier 31 to limit the uper limit of the current command value according to the magnitude of the pressure command value. That is, the circuit 32 outputs a current command signal $\Delta$eni', which is limited by the small upper limit value when the pressure command value is small and which is limited by the large upper limit value when the pressure command value is large.

Figure 5:
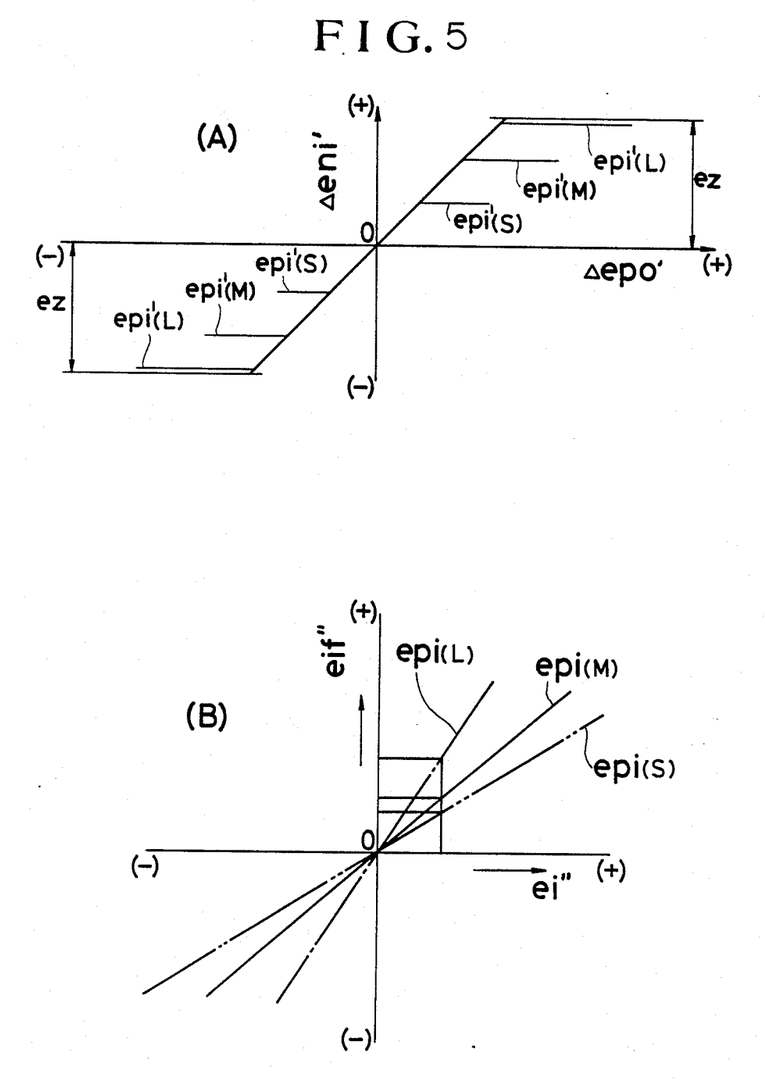

FIG. 5 (A) is a characteristic curve showing the relationship between the input signal $\Delta$epo' and output signal $\Delta$eni' of the current command signal limiting circuit 30 with the magnitude of the pressure command signal epi being as a parameter. As may seen in FIG. 5 (A), the smaller the pressure command signal epi the magnitude of the output signal is limited by the lower value of the input signal.

When the pressure command signal epi is set to a lower value and the value of the command signal epi' is smaller than Zener voltage ez of Zener diodes 48 and 49, the magnitude of the output signal is limited to the value of the command signal epi'. In this case, the saturated value ez of the output singal is the value determined by Zener voltage of the Zener diode in the output limiting circuit 32 shown in FIG. 2, and the magnitude of the Zener voltage is set to the maximum value required for control of back pressure to function as a safety circuit so as not to generate the excessively great output torque in the motor.

In this embodiment, the current command value is limited according to the magnitude of the pressure command value as described above, and therefore, where the the pressure command value is large, the magnitude of the current command signal applied to the adding point B is limited to a lower value than that of prior art shown in FIG. 8. Thus, conversely, the amplification degree of the pressure control amplifier 22 may be increased to increase the current command signal $\Delta$epo', and as the result, the pressure responsive characteristic of the load to the pressure command is improved as shown in FIG. 9 (B) relative to FIG. 9 (A). More specifically, as may be understood from the comparison of characteristics shown in FIGS. 9 (A) and (B), the rising angle of the pressure detection signal curve showing the pressure responsiveness is $\alpha' > \alpha$ and the setting time is $t' < t$. Accordingly, it is possible to carry out the back pressure control by which the back pressure promptly reaches the set value.

Figure 4:
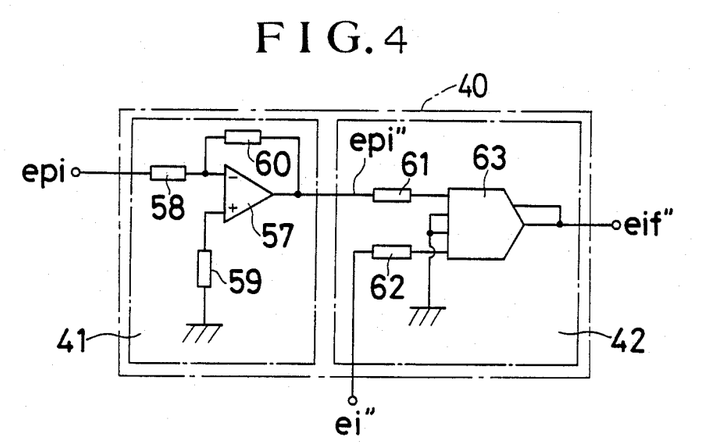
FIG. 4 is a circuit diagram showing a specific example of a current detection signal correcting circuit shown in FIG. 3.

In the embodiment shown in FIG. 3, a current detection signal correcting circuit 40 for correcting an increase or decrease in current detection signal value according to the magnitude of the pressure command value is added to the converter circuit 24. This circuit 40 comprises, as shown in FIG. 4 in detail, a well known amplifier 41 composed, for example, of an operational amplifier 57 and resistors 58, 59 and 60 and a feedback amount exchange circuit 42. In this circuit, pressure command signal epi outputted from the back pressure setting device 21 is amplified by the amplifier 41 with a predetermined amplification degree and outputted as a command signal epi".

The feedback converter circuit circuit 42 is composed, for example, of a well known multiplier 63 and resistors 61 and 62, and receives the aforesaid command signal epi" and the current detection signal ei" from the converter circuit 24 to release the current detection signal eif" corrected so as to decrease the current detection signal value when the pressure command value is small and increase the current detection signal value when the pressure command value is large.

FIG. 5 (B) is the characteristic curve showing the relationship between the input signal ei" and output signal eif" of the current detection signal correcting circuit 40 with the magnitude of the pressue command signal epi being the controlling parameter. As may be seen from FIG. 5 (B), the greater the pressure command signal epi relative to the input signal of the same magnitude, the output signal increases.

In this embodiment, the current detection signal value is corrected to be increased or decreased according to the magnitude of the pressure command value, and therefore, where the pressure command value is large, the value of the current detection signal applied to the adding point B exceeds the value in case of prior art shown in FIG. 8. Thereby, the amplification degree of the pressure control amplifier 22 may be increased to increase the command signal $\Delta$epo" likewise the embodiment shown in FIG. 1, as a consequence of which the responsive characteristic relative to the pressure command is improved as shown in FIG. 9 (B) likewise the embodiment previously mentioned, and it is possible to carry out the back pressure control by which the back pressure promptly reaches the set value of the back pressure.

While in the present invention, a servo-motor is provided for injection and for rotation of plunger, and a further electric motor is used for exclusive use of back pressure control, it is to be noted that a servo-motor for injection can be also used for back pressure control and a motor for rotation of a screw can be separately provided.

Moreover, in an injection molding machine of a so-called preplasticization type which is separately provided with a plasticizing device for material, it is possible to carry out the back pressure control for the injection plunger during the step of charging material, in a manner similar to that as described above.

What is claimed is:

1. A method for controlling back pressure in an injection molding machine, comprising the steps of:
   deploying an electric motor for controlling the back pressure which develops in the injection molding machine, the electric motor being controllable by a motor drive signal;
   electrically detecting the back pressure prevailing in the injection molding machine by detecting the pressure of one of a molten material being molded and a back pressure arising from an injection plunger of the motor and generating a prevailing back pressure signal representative thereof;
   feeding back the prevailing back pressure signal and combining same with a set back-pressure value to generate the motor drive signal which is effective to cause the prevailing back pressure to equal the set back-pressure value; and
   limiting the magnitude of the motor drive signal such that it would not exceed a reference magnitude which reference magnitude is derived from the magnitude of the set back-pressure value.

2. The method of claim 1 wherein the motor drive signal comprises a current command signal ($\Delta epo'$) and said limiting includes controlling the current command signal such that its magnitude does not exceed a scaled magnitude of said set back pressure value.

3. The method of claim 2, wherein the magnitude of the current command signal is controlled such that its magnitude does not exceed the lesser of said scaled magnitude of said set back pressure value and a predetermined maximum value.

4. The method of claim 3, wherein said predetermined maximum value is set by Zener diodes.

5. A method for controlling back pressure in an injection molding machine, comprising the steps of:
   deploying an electric motor for controlling the back pressure which develops in the injection molding machine, the electric motor being controllable by a motor drive signal;
   electrically detecting the back pressure prevailing in the injection molding machine by detecting the pressure of one of a molten material being molded and a back pressure arising from an injection plunger of the motor and generating a prevailing back pressure signal representative thereof;
   feeding back the prevailing back pressure signal and combining same with a set back-pressure value to generate a current command signal which is effective to cause the prevailing back pressure to equal the set back-pressure value;
   generating a current detection signal representative of a torque prevailing in the motor;
   limiting the magnitude of the current detection signal such that it would not exceed a reference magnitude which reference magnitude is derived from the magnitude of the set back-pressure value; and
   combining the limited current detection signal with the current command signal to generate therefrom the motor drive signal.

6. The method of claim 5, wherein the magnitude of the current detection signal is limited such that it does not exceed a scaled magnitude of the set back pressure value.

7. The method of claim 6, wherein the magnitude of the current detection signal is limited such that its magnitude does not exceed the lesser of said scaled magnitude of said set back pressure value and a predetermined maximum value.

8. A method for controlling back pressure in an injection molding machine, comprising the steps of:
   deploying an electric motor for controlling the back pressure which develops in the injection molding machine, the electric motor being controllable by a motor drive signal;
   electrically detecting the back pressure prevailing in the molding machine by detecting the pressure of one of a molten material being molded and a back pressure arising from an injection plunger of the motor and generating a prevailing back pressure signal representative thereof;
   feeding back the prevailing back pressure signal and combining same with a set back-pressure value to generate a first signal which is effective to cause the prevailing back pressure to equal the set back-pressure value;
   limiting the magnitude of the first signal such that it would not exceed a reference magnitude which reference magnitude is derived from the magnitude of the set back-pressure;
   generating a current detection signal representative of torque prevailing in the motor;
   amplifying the current detection signal by an amplifying factor which varies in accordance with the value of said set back-pressure value; and
   combining the amplified current detection signal with the limited first signal and generating
   the motor drive signal for driving the motor.

9. An injection molding machine, comprising:
   an injection screw and an electric motor for controlling a back pressure prevailing in the injection molding machine;
   means for electrically detecting the back pressure prevailing in the injection molding machine by detecting the pressure of one of a molten material being molded and a back pressure arising from the injection plunger and for generating a prevailing back pressure signal;
   means for driving the motor electrically by feeding back the prevailing back pressure signal to cause the prevailing back pressure to equal a set back-pressure value; and
   means for limiting the magnitude of a torque developed by the motor such that the same would not rise higher than a reference value derived from the magnitude of the set back-pressure value.

10. The injection molding machine of claim 9, further comprising means for summing the prevailing back pressure signal and the set back pressure value and for generating a current command signal and wherein the limiting means comprises a limiting circuit for limiting the magnitude of the current command signal below the magnitude of a scaled magnitude of the set back pressure value.

11. The injection molding machine of claim 10, further comprising current detection means for detecting a current flowing in the motor and a second summing circuit for summing the current detection signal with the limited current command signal for generating an output signal and for coupling the output signal to the motor.

12. An injection molding machine, comprising:

an injection screw and an electric motor for controlling a back pressure prevailing in the injection molding machine;

means for electrically detecting the back pressure prevailing in the injection molding machine by detecting the pressure of one of a molten material being molded and a back pressure arising from the injection plunger and for generating a prevailing back pressure signal;

means for driving the motor electrically and by feeding back the prevailing back pressure signal and producing based thereon a first signal that causes the prevailing back pressure to equal a set back-pressure value;

means for generating a current detection signal representative of a torque prevailing in the motor;

means for limiting the magnitude of the current detection signal such that the same would not rise higher than a reference value derived from the magnitude of the set back-pressure value; and means for generating a motor drive signal on the basis of the limited current detection signal and the first signal.

* * * * *